US010102600B2

(12) United States Patent
Yajima et al.

(10) Patent No.: US 10,102,600 B2
(45) Date of Patent: Oct. 16, 2018

(54) HEAD MOUNTED DISPLAY DEVICE, CONTROL METHOD FOR HEAD MOUNTED DISPLAY DEVICE, AND COMPUTER PROGRAM

(71) Applicant: SEIKO EPSON CORPORATION, Tokyo (JP)

(72) Inventors: Kenro Yajima, Matsumoto (JP); Yuichi Mori, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 33 days.

(21) Appl. No.: 14/832,416

(22) Filed: Aug. 21, 2015

(65) Prior Publication Data

US 2016/0077340 A1    Mar. 17, 2016

(30) Foreign Application Priority Data

Sep. 16, 2014  (JP) ................................. 2014-187590

(51) Int. Cl.
*G02B 27/01*    (2006.01)
*G06T 1/00*    (2006.01)

(52) U.S. Cl.
CPC .................................. *G06T 1/0021* (2013.01)

(58) Field of Classification Search
CPC ........ G02B 27/0172; G02B 2027/0178; G02B 2027/0138; G02B 2027/014; G02B 27/009; G06T 1/0021; G06T 19/006
USPC ............ 345/7–9, 156, 169; 348/53; 382/100
See application file for complete search history.

(56) References Cited

U.S. PATENT DOCUMENTS

| 5,991,426 | A | * | 11/1999 | Cox | .................... | H04N 1/32304 |
| | | | | | | 348/473 |
| 6,792,130 | B1 | * | 9/2004 | Jones | .................... | G06T 1/0085 |
| | | | | | | 375/E7.089 |
| 2003/0105950 | A1 | * | 6/2003 | Hirano | ................ | G06F 21/6218 |
| | | | | | | 713/100 |
| 2003/0161496 | A1 | * | 8/2003 | Hayashi | ................ | G06T 1/0028 |
| | | | | | | 382/100 |
| 2003/0228030 | A1 | * | 12/2003 | Wendt | ................... | G06T 1/0064 |
| | | | | | | 382/100 |
| 2005/0059339 | A1 | * | 3/2005 | Honda | ..................... | G06K 1/12 |
| | | | | | | 455/3.01 |
| 2013/0241948 | A1 | * | 9/2013 | Kimura | .................. | G09G 5/006 |
| | | | | | | 345/589 |

(Continued)

FOREIGN PATENT DOCUMENTS

| JP | 2003-333316 A1 * | 11/2003 |
| JP | 2005-051533 A | 2/2005 |
| JP | 2011-015210 A | 1/2011 |

(Continued)

*Primary Examiner* — Stacy Khoo
(74) *Attorney, Agent, or Firm* — Oliff PLC

(57) ABSTRACT

A head mounted display device includes an imaging unit that images an outside scene, an image display unit that displays an image and is capable of transmitting the outside scene, an electronic watermark acquisition unit that acquires an electronic watermark image embedded such that watermark information is not visually recognized by a user from a captured image of the outside scene, and a display image control unit that displays a watermark information corresponding image associated with the watermark information embedded in the acquired electronic watermark image on the image display unit.

11 Claims, 7 Drawing Sheets

(56) References Cited

U.S. PATENT DOCUMENTS

2014/0086445 A1\* 3/2014 Brubeck .......... H04N 21/23439
  382/100
2014/0130148 A1 5/2014 Sako et al.

FOREIGN PATENT DOCUMENTS

| JP | 2012053629 A | | 3/2012 |
|---|---|---|---|
| JP | 2014092941 A | | 5/2014 |
| KR | 20120045131 A | \* | 5/2012 |

\* cited by examiner

HEAD MOUNTED DISPLAY DEVICE, CONTROL METHOD FOR HEAD MOUNTED DISPLAY DEVICE, AND COMPUTER PROGRAM

BACKGROUND

1. Technical Field

The present invention relates to a technology for a head mounted display device.

2. Related Art

A head mounted display device (HMD) that is a display device mounted on a head is known. The head mounted display device, for example, generates an image light using a liquid crystal display and a light source, guides the generated image light to the eyes of a user using a projection optical system and a light guide plate, and causes the user to visually recognize a virtual image. In the head mounted display device, there are two types: a transmission type device with which the user can visually recognize an outside scene in addition to the virtual image and a non-transmission type with which the user cannot visually recognize the outside scene. There are two types of the transmission type head mounted display device: an optical transmission type head mounted display device and a video transmission type head mounted display device.

In JP-A-2012-53629, an image processing device is disclosed, in which electronic watermark information imaged by an imaging unit and applied to a paper medium is acquired, the acquired electronic watermark information and information held in advance are collated, and then, iris information is acquired as identification information of a user. Then, the device causes the user to visually recognize an image different for each user based on the acquired iris information. In addition, in JP-A-2014-92941, an information processing device is disclosed, in which a face photograph of an acquaintance of the user and a face photograph of a person unrelated to the user are collectively displayed in one image and the user selects the face photograph of the acquaintance of the user from the displayed image, and then, a user authentication is performed by means of a method different from an inorganic password that is an enumeration of numbers easily forgetful to the user.

However, in the technology disclosed in JP-A-2012-53629, resulting from the acquisition of the electronic watermark information, since each user visually recognizes the image different for each user from the information held in advance, it is necessary to store the information different for each user in advance. Thus, there is a desirable concern to cause each user to visually recognize the image different for each user without storing the information different for each user. In addition, in the technology disclosed in JP-A-2012-53629 and JP-A-2014-92941, in order to perform the user authentication, a device for acquiring the iris information of the user or a plurality of selection processing tasks such as selections of a plurality of images is needed. Thus, there is a desirable concern to perform the user authentication by a simple method. Besides, in an image processing technology in the related art, it is desirable to miniaturize the size, to reduce the cost, to save the resources, to make it easy to manufacture, and to improve the usability.

SUMMARY

An advantage of some aspects of the invention is to solve at least a part of the problems described above, and the invention can be implemented as the following forms.

(1) An aspect of the invention provides a head mounted display device. The head mounted display device includes an imaging unit that images an outside scene, an image display unit that displays an image and is capable of transmitting the outside scene, an electronic watermark acquisition unit that acquires an electronic watermark image embedded such that watermark information is not visually recognized by a user from a captured image of the outside scene, and a display image control unit that displays a watermark information corresponding image associated with the watermark information embedded in the acquired electronic watermark image on the image display unit. According to the head mounted display device of this aspect, even if the information associated with the electronic watermark image detected from the captured image of the outside scene is not stored in advance, the electronic watermark image embedded in the electronic watermark image can be displayed on the image display unit, and thus, the usability of the head mounted display device is improved. In addition, unlike another device such as a television set, which a plurality of people watch, in the head mounted display device, only the user can visually recognize the image displayed on the image display unit. Therefore, only the user can visually recognize the image different from the image recognized by other persons, and thus, the usability of the head mounted display device is further improved.

(2) In the head mounted display device according to the aspect described above, the electronic watermark acquisition unit may output the watermark information embedded in the acquired electronic watermark image. According to the head mounted display device of this aspect, the watermark information embedded in the detected electronic watermark image is output. Therefore, not only it is possible to cause the user to visually recognize the watermark information corresponding image but also the output watermark information can be used, and thus, the user convenience is improved.

(3) The head mounted display device according to the aspect described above may further include a personal information specification unit that specifies personal information, and the display image control unit may set the watermark information corresponding image based on the specified personal information. According to the head mounted display device of this aspect, even when the detected electronic watermark images are the same, the images different from each other according to the stored personal information are displayed on the image display unit. Therefore, the images according to the needs or the state of the user can be visually recognized by the user, and thus, the user convenience is improved.

(4) In the head mounted display device according to the aspect described above, in a case where the watermark information embedded in the acquired electronic watermark image includes plural kinds of watermark information corresponding images, the display image control unit may select one image from among the plural kinds of the watermark information corresponding images based on the specified personal information, and may display the selected one watermark information corresponding image on the image display unit. According to the head mounted display device of this aspect, even when the detected electronic watermark images are the same, the image selected according to the stored personal information from a plurality of images is displayed on the image display unit. Therefore, the images according to the needs or the state of the user can be visually recognized by the user, and thus, the user convenience is improved.

(5) The head mounted display device according to the aspect described above may further include an operation unit that receives an operation, and the electronic watermark acquisition unit may acquire one watermark information item from the plural kinds of the watermark information based on the received operation timing. According to the head mounted display device of this aspect, the displayed watermark information corresponding images are different from each other depending on the timing of the operation. Therefore, it is possible to cause the user to visually recognize various images according to the situation of the user.

(6) In the head mounted display device according to the aspect described above, the personal information may be information associated with an age of the user of the head mounted display device. According to the head mounted display device of this aspect, even when the detected electronic watermark images are the same, the images different from each other according to the age as the personal information are displayed on the image display unit. Therefore, the display or non-display of the images having age limit can be distinguished for each user, and thus, the user convenience is improved.

(7) In the head mounted display device according to the aspect described above, in a case where the watermark image is a moving picture configured of a plurality of frames, the electronic watermark acquisition unit may select and acquire a frame in which the watermark information is embedded among the plurality of frames. According to the head mounted display device of this aspect, it is sufficient that a limited number of frames is detected from the plurality of frames without needing to detect all the frames in the moving picture, and thus, the burden of image processing is reduced.

(8) In the head mounted display device according to the aspect described above, the display image control unit may add information associated with the watermark image based on the watermark information embedded in the acquired watermark image. According to the head mounted display device of this aspect, the user can visually recognize the watermark image having a high performance property by the information further associated with the watermark image.

Not all of a plurality of configuration elements in each of the above-described aspects of the invention is essential. In order to solve a part or all of the problems described above, or in order to achieve a part or all of the effects described herein, a change, a deletion, a substitution of a new other configuration element and a partial deletion of the limiting content can appropriately be performed regarding a part of the plurality of configuration elements. In addition, in order to solve a part or all of the problems described above, or in order to achieve a part or all of the effects described herein, by combining a part or all of the technical features included in an aspect of the invention described above with a part or all of the technical features included in another aspect of the invention described above, an independent new aspect of the invention can be made.

For example, an aspect of the invention can be implemented as a device that includes four elements of the imaging unit, the image display unit, the electronic watermark acquisition unit, and the display image control unit. That is, the device may or may not include the imaging unit. In addition, the device may or may not include the image display unit. In addition, the device may or may not include the electronic watermark acquisition unit. In addition, the device may or may not include the display image control unit. The imaging unit, for example, may image the outside scene. The image display unit, for example, may be capable of transmitting the outside scene in addition to displaying the image. The electronic watermark acquisition unit may, for example, acquire the electronic watermark image embedded such that the watermark information is not visually recognized by the user from the captured image of the outside scene. The display image control unit may, for example, display the watermark information corresponding image associated with the watermark information embedded in the acquired electronic watermark image on the image display unit. This device can be implemented, for example, as the head mounted display device, but can be implemented as another device other than the head mounted display device. According to the aspect like this, it is possible to solve at least one of the various problems such as an improvement and simplification of the operability of the device, an integration of the device, and an improvement of the user convenience using the device. Any of the above-described part or all of the technical features in each aspect of the head mounted display device can be applied to this device.

The invention can be implemented in various forms other than the head mounted display device. For example, the invention can be implemented in the forms of: the control method for head mounted display device, the information system that includes the head mounted display device, the computer program for implementing the control method for head mounted display device and the information system, a storage medium that stores the computer program, and a data signal incorporated in a carrier wave in which the computer program is included.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head Mounted Display Device

Figure 1:
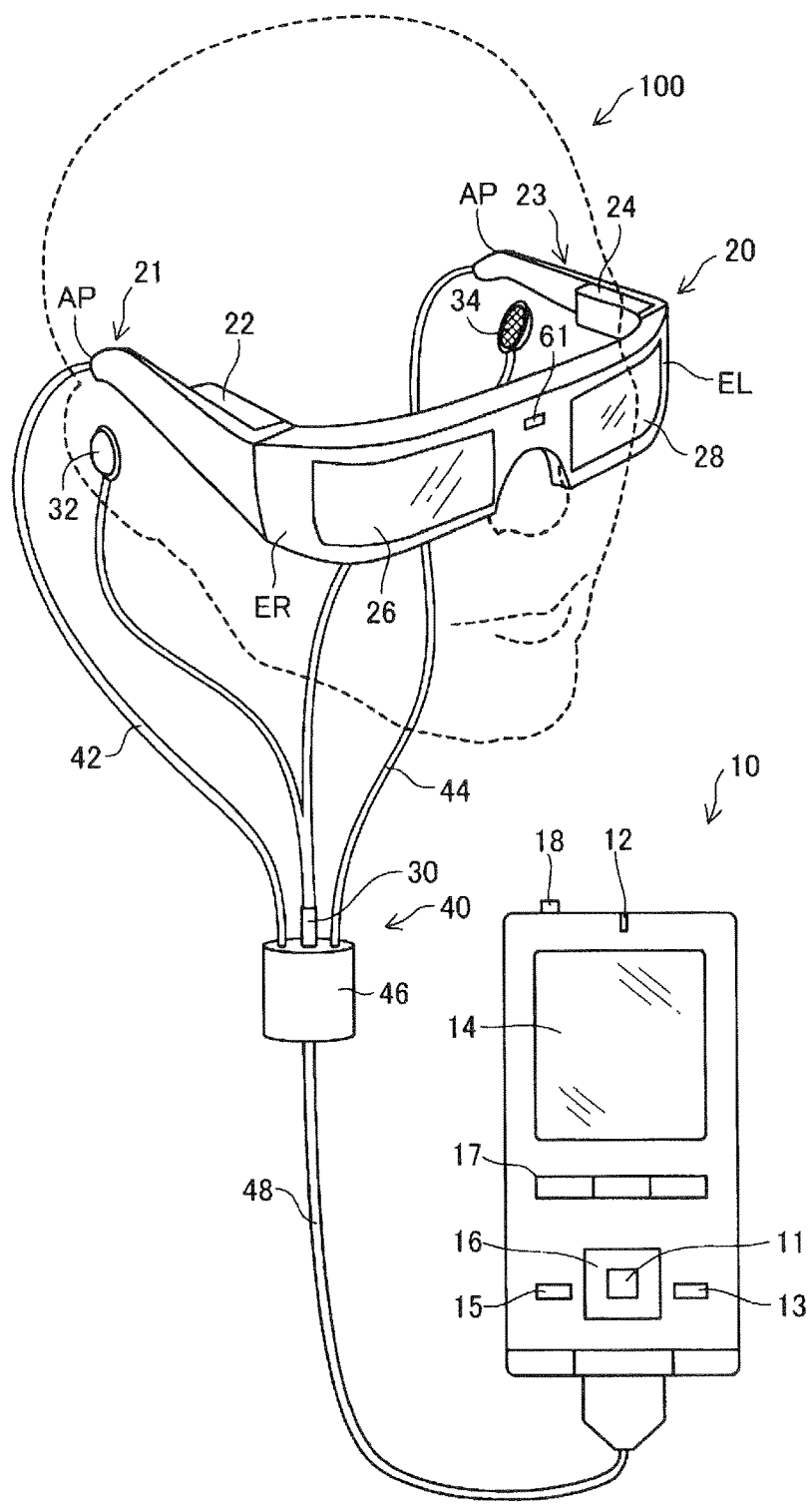
FIG. 1 is an explanatory diagram illustrating an appearance configuration of a head mounted display device.

FIG. 1 is an explanatory diagram illustrating an appearance configuration of a head mounted display device 100 (HMD 100). The HMD 100 is a display device that is mounted on a head and called as head mounted display device (HMD). The HMD 100 in the present embodiment is an optical transmission type head mounted display device which is capable of directly visually recognizing an outside scene at the same time when a user visually recognizes a virtual image. In this description, the virtual image visually recognized by the user using the HMD 100 is referred to as a "display image" for convenience.

The HMD 100 includes an image display unit 20 that causes the user to visually recognize the virtual image in a state of being mounted on the user's head and a controller 10 that controls the image display unit 20.

The image display unit 20 is a mounting body to be mounted on the user's head and has a glasses shape in this embodiment. The image display unit 20 includes a right holding portion 21, a right display drive unit 22, a left holding portion 23, a left display drive unit 24, a right optical image display unit 26, a left optical image display unit 28, and a camera 61. The right optical image display unit 26 and the left optical image display unit 28 are respectively disposed so as to be positioned in front of the right and left eyes of the user when the user wears the image display unit 20. One end of the right optical image display unit 26 and one end of the left optical image display unit 28 are mutually connected at the position corresponding to the position between the eyebrows of the user when the user wears the image display unit 20.

The right holding portion 21 is a member provided to extend from an end portion ER which is the other end of the right optical image display unit 26 to a position corresponding to a side head of the user at the time when the user wears the image display unit 20. Similarly, the left holding portion 23 is a member provided to extend from an end portion EL which is the other end of the left optical image display unit 28 to a position corresponding to a side head of the user at the time when the user wears the image display unit 20. The right holding portion 21 and the left holding portion 23 hold the image display unit 20 on the head of the user in the form of temples of the glasses.

The right display drive unit 22 and the left display drive unit 24 are disposed on the side facing the user's head at the time when the user wears the image display unit 20. Hereinafter, the right holding portion 21 and the left holding portion 23 will be collectively and simply referred to as a "holding portion", the right display drive unit 22 and the left display drive unit 24 are collectively and simply referred to as a "display drive unit", and the right optical image display unit 26 and the left optical image display unit 28 are collectively referred to as an "optical image display unit".

The display drive units 22 and 24 include liquid crystal displays 241 and 242 (hereinafter, referred to as LCDs 241 and 242), and projection optical systems 251 and 252 (refer to FIG. 2). Detailed configurations of the display drive units 22 and 24 will be described below. The optical image display units 26 and 28 as optical members include light guide plates 261 and 262 (refer to FIG. 2) and a dimming plate. The light guide plates 261 and 262 are formed of an optically transmissive resin material, and guide image light output from the display drive units 22 and 24 to the eyes of the user. The dimming plate is a thin plate-shaped optical element and is disposed so as to cover the surface side of the image display unit 20 which is a side opposite to the user's eyes. The dimming plate protects the light guide plates 261 and 262 and suppresses the damage of the light guide plates 261 and 262 or the adhesion of dirt. In addition, by adjusting the light transmittance of the dimming plate, the amount of external light that enters the user's eyes can be adjusted and then, the ease of the visual recognition of the virtual image can be adjusted. The dimming plate can be omitted to be provided.

The camera 61 is disposed at the position corresponding to the position between the eyebrows of the user at the time when the user wears the image display unit 20. Therefore, the camera 61 images the outside scene which is a scene outside the sight line direction of the user and acquires the captured image which is an image captured in the state in which the user wears the image display unit 20 on his head. The camera 61 is a monocular camera, but may be a stereo camera. The camera 61 corresponds to the imaging unit in the aspect of the invention.

The image display unit 20 further includes a connection portion 40 that connects the image display unit 20 to the controller 10. The connection portion 40 includes a main body cord 48 connected to the controller 10, a right cord 42, a left cord 44, and a connection member 46. The right cord 42 and the left cord 44 are cords in which the main body cord 48 is branched into two. The right cord 42 is inserted into a housing of the right holding portion 21 from a distal portion AP in the extending direction of the right holding portion 21, and is connected to the right display drive unit 22. Similarly, the left cord 44 is inserted into a housing of the left holding portion 23 from a distal portion AP in the extending direction of the left holding portion 23, and is connected to the left display drive unit 24. The connection member 46 is provided on the branch point of the main body cord 48 and the right cord 42 and the left cord 44, and has a jack for connecting an earphone plug 30. A right earphone 32 and a left earphone 34 extend from the earphone plug 30.

The image display unit 20 and the controller 10 perform the transmission of various signals via the connection portion 40. To each of the end portion on the opposite side of the connection member 46 in the main body cord 48 and the controller 10, connectors (not illustrated) fitted to each other are provided. The controller 10 and the image display unit 20 are connected to or separate from each other by fitting or releasing the connector of the main body cord 48 to/from the connector of the controller 10. For example, as the right cord 42, the left cord 44, and the main body cord 48, a metal cable or an optical fiber can be adopted.

The controller 10 is a device for controlling the HMD 100. The controller 10 includes a determination key 11, a lighting unit 12, a display switching key 13, a track pad 14, a brightness switching key 15, a direction key 16, a menu key 17, and a power switch 18. The determination key 11 detects a pressing operation and outputs a signal that determines the content operated in the controller 10. The lighting unit 12 notifies of the operation state of the HMD 100 according to the light emitting state thereof. For example, the power ON or OFF state is the operation state of the HMD 100. For example, a LED is used as the lighting unit 12. The display switching key 13 detects the pressing operation, and for example, outputs a signal that switches display modes of the content moving picture to and from the 3D and 2D. The track pad 14 detects the operation of the user's finger on the operation surface of the track pad 14, and outputs a signal that corresponds to the detected content. Various types of a track pad such as an electrostatic type, a pressure sensing type, or an optical type can be adopted as the track pad 14. The brightness switching key 15 detects the pressing operation and outputs a signal that increases or decreases the brightness of the image display unit 20. The direction key 16 detects the pressing operation to the key corresponding to the up, down, right, and left direction, and outputs a signal that corresponds to the detected content. The power switch 18 switches the power-on state of the HMD 100 by detecting a sliding operation of the switch.

Figure 2:
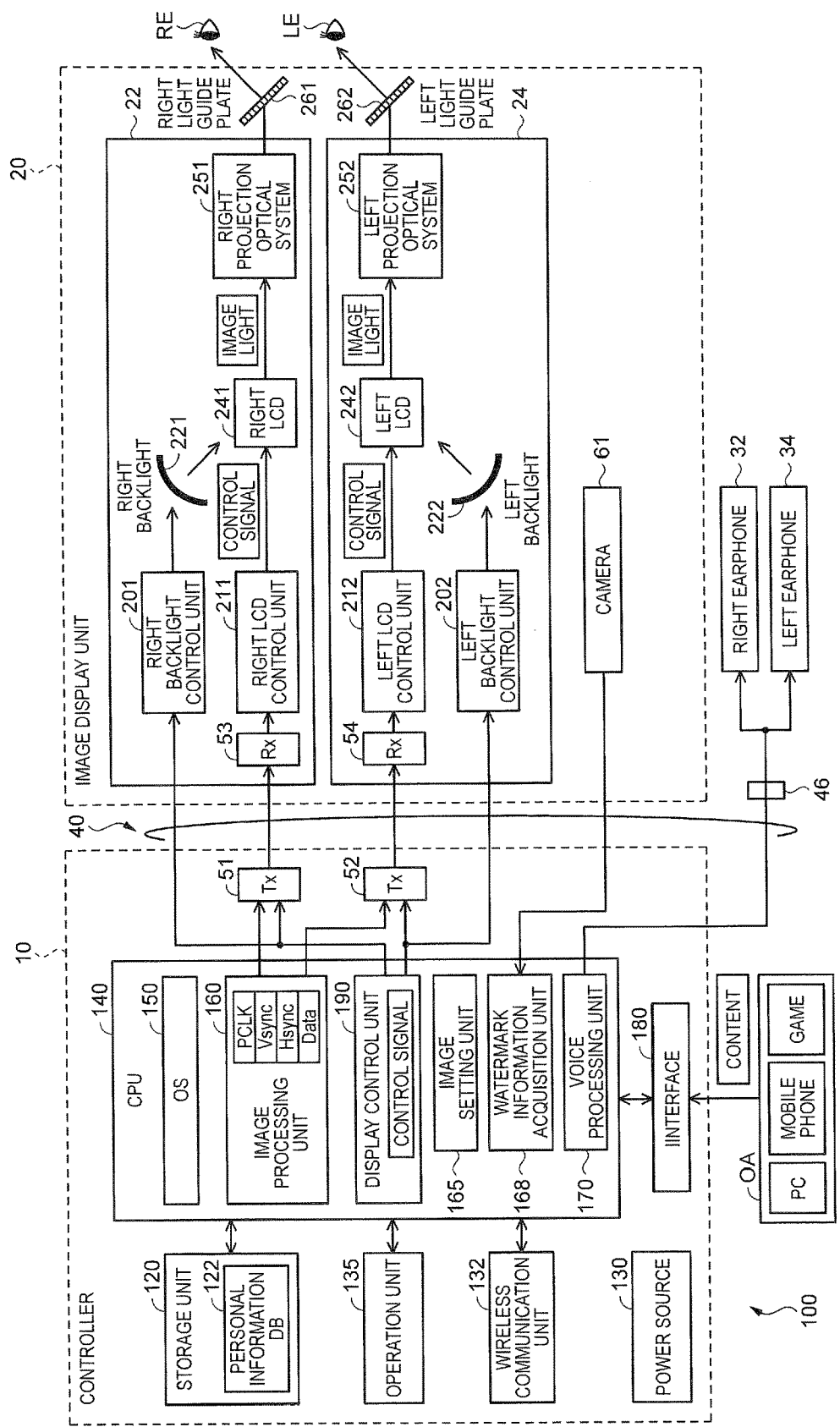
FIG. 2 is a block diagram functionally illustrating the configuration of the HMD.

FIG. 2 is a block diagram functionally illustrating a configuration of the HMD 100. As illustrated in FIG. 2, the controller 10 includes a storage unit 120, a power source 130, a wireless communication unit 132, an operation unit 135, a CPU 140, an interface 180, a transmission unit 51 (Tx 51), and a transmission unit 52 (Tx 52). The operation unit 135 receives an operation of the user, and is configured to include a determination key 11, a display switching key 13, a track pad 14, a brightness switching key 15, a direction key 16, a menu key 17, and a power switch 18. The wireless communication unit 132 performs the wireless communication between other apparatus such as a content server, a television set, and a personal computer in accordance with a predetermined wireless communication standard.

The power source 130 supplies the power to each unit of the HMD 100. For example, a secondary battery can be used as the power source 130. The storage unit 120 stores various computer programs. The storage unit 120 is configured to include a ROM, a RAM, or the like. The storage unit 120 includes a personal information data base 122 (personal information DB 122) that stores personal information such as an age or gender of the user of the HMD100. The personal information DB 122 stores the personal information of the user such as the name, the age, the gender, an address, a telephone number, an occupation, and a hobby that are input from the operation unit 135 operated by the user. Therefore, by collating the personal information stored in the personal information DB 122, the personal information of the user of the HMD 100 is specified. Even when a plurality of users uses the same HMD 100, by setting a password different for each user and collating the personal information of a specific user using the HMD 100, the personal information for another user may not be collated. The personal information DB 122 corresponds to a personal information specification unit in the aspects of the invention.

The CPU 140 functions as an operating system 150 (OS 150), a display control unit 190, a voice processing unit 170, an image processing unit 160, a watermark information acquisition unit 168, and an image setting unit 165 by reading and executing the computer program stored in the storage unit 120.

The display control unit 190 generates a control signal that controls the right display drive unit 22 and the left display drive unit 24. Specifically, the display control unit 190 individually controls a drive ON/OFF of the right LCD 241 by a right LCD control unit 211, a drive ON/OFF of a right backlight 221 by a right backlight control unit 201, a drive ON/OFF of a left LCD 242 by a left LCD control unit 212, and a drive ON/OFF of a left backlight 222 by a left backlight control unit 202, using the control signal. In this way, the display control unit 190 controls the generation and emission of the image light by each of the right display drive unit 22 and the left display drive unit 24. For example, the display control unit 190 causes both of the right display drive unit 22 and the left display drive unit 24 to generate the image light, causes only one of the display drive unit to generate the image light, or causes none of the display drive units to generate the image light. The generation of the image light is referred to as "display the image".

The display control unit 190 transmits each control signal for the right LCD control unit 211 and the left LCD control unit 212 via the transmission unit 51 and the transmission unit 52, respectively. In addition, the display control unit 190 transmits each control signal for the right backlight control unit 201 and the left backlight control unit 202.

The image processing unit 160 acquires the image signal included in the content. The image processing unit 160 separates synchronization signals such as a vertical synchronization signal VSync and a horizontal synchronization signal HSync from the acquired image signal. In addition, the image processing unit 160 generates a clock signal PCLK using a phase locked loop (PLL) circuit (not illustrated) according to the cycle of the separated vertical synchronization signal VSync and the horizontal synchronization signal HSync. The image processing unit 160 converts an analog image signal which is the separated synchronization signal to a digital image signal using an A/D conversion circuit (not illustrated). Then, the image processing unit 160 stores the conversion-resulted digital image signal in the DRAM of the storage unit 120 on a frame basis as image data (RGB data) of a target image. The image processing unit 160 may execute image processing tasks such as various tone correction processing tasks such as resolution conversion processing or adjustment of the brightness and the saturation, and keystone correction processing with respect to the image data, if necessary.

The image processing unit 160 transmits each of the generated clock signal PCLK, the vertical synchronization signal VSync, the horizontal synchronization signal HSync, the image data stored in the DRAM in the storage unit 120 via the transmission unit 51 and the transmission unit 52. The image data transmitted via the transmission unit 51 is referred to as "image data for the right eye" and the image data transmitted via the transmission unit 52 is referred to as "image data for the left eye". The transmission unit 51 and the transmission unit 52 function as a transceiver for the serial transmission between the controller 10 and the image display unit 20.

The voice processing unit 170 acquires a voice signal included in the content, amplifies the acquired voice signal, and supplies the voice signal to a speaker (not illustrated) in the right earphone 32 connected to the connection member 46 and a speaker (not illustrated) in the left earphone 34. For example, in a case where the Dolby® system is adopted, processing is performed on the voice signal and the different sounds of which, for example, the frequency or the like is changed are output from each of the right earphone 32 and the left earphone 34.

The watermark information acquisition unit 168 detects the electronic watermark image in which the electronic watermark is applied, from the images captured by the camera 61 (captured image by the camera 61). The electronic watermark herein means a technology for invisibly embedding specific information into a digital content image. The electronic watermark image includes not only a still image but also the moving picture such as video images. The watermark information embedded in the electronic watermark image so as not to be visually recognized by the user in the aspect of the invention includes information formed by the wavelength other than the visible light such as the infrared or the ultraviolet light, an image that cannot be visually recognized by the user due to the high frame rate, and an image having a small size which cannot be visually recognized by the user if a zooming function is not used. In the moving picture in the embodiment described below, the number of frames displayed per second is 24 frames, and the electronic watermark is embedded in one frame from among the 24 frames. In other words, the electronic watermark is embedded in only one frame per second in the moving picture.

When the electronic watermark image is detected, the watermark information acquisition unit 168 collates the electronic watermark image and the personal information stored in the personal information DB 122. The watermark information acquisition unit 168 determines the processing of the electronic watermark image such as whether or not to display the electronic watermark image or the display mode of the electronic watermark image based on a collation result. As a specific exemplified result of collating the data embedded in the electronic watermark image and the personal information, the determination whether or not to display the electronic watermark image is performed by comparing the age of the user and a threshold value of the age set in the electronic watermark in advance. As another processing of the electronic watermark image, a discount coupon that can be used at a specific store is output by performing a specific processing on the detected electronic watermark image. In addition, in a case where the image in which the electronic watermark image is embedded is a moving picture, for example, after each frame of 24 frames is detected, the watermark information acquisition unit 168 acquires only a frame of every 24 frames from a specific frame in which the electronic watermark image is embedded. In this case, it is sufficient that the watermark information acquisition unit 168 detects only one frame per second without necessarily detecting all the frames in the moving picture. Therefore, the burden of the image processing is reduced.

As a method of embedding the electronic watermark in a specific image, there are various methods such as a batch work method, an embedding in a frequency domain, an embedding by a spread spectrum, a color specification conversion, or a run-length method. The watermark information acquisition unit 168 corresponds to the electronic watermark acquisition unit in the aspect of the invention. The data embedded in the electronic watermark image corresponds to watermark information in the aspect of the invention.

The image setting unit 165 displays the image which is based on the electronic watermark image detected and processed by the watermark information acquisition unit 168, on the optical image display units 26 and 28. Hereinafter, the image displayed on the optical image display units 26 and based on the processed electronic watermark image is referred to as a watermark corresponding image. As the watermark corresponding image, there are subtitles of a movie as a moving picture which is watched by the user as the outside scene or a character image representing the acquisition result such as the acquired discount coupon. For example, in a case where subtitles of a movie are displayed on the optical image display units 26 and 28, the subtitles having a different ratio of the Chinese characters and the Japanese characters may be displayed based on the age stored in the personal information DB 122. The image setting unit 165 corresponds to the display image control unit in the aspect of the invention. The watermark corresponding image corresponds to the watermark information corresponding image in the aspect of the invention.

The interface 180 is an interface for connecting various external apparatuses OA which are the supply sources of the content to the controller 10. As the external apparatuses OA, a personal computer (PC), a mobile phone terminal, and a game terminal can be exemplified. As the interface 180, for example, a USB interface, a micro USB interface, an interface for a memory card can be used.

The image display unit 20 includes the right display drive unit 22, the left display drive unit 24, a right light guide plate 261 as the right optical image display unit 26, a left light guide plate 262 as the left optical image display unit 28, and the camera 61.

The right display drive unit 22 includes a reception unit 53 (Rx 53), the right backlight control unit 201 (right BL control unit 201) and the right backlight 221 (right BL 221) that function as light sources, the right LCD control unit 211 and the right LCD 241 that function as display elements, and a right projection optical system 251. The right backlight control unit 201 and the right backlight 221 function as light sources. The right LCD control unit 211 and the right LCD 241 function as display elements. The right backlight control unit 201, the right LCD control unit 211, the right backlight 221, and the right LCD 241 are collectively referred to as an "image light generation unit".

The reception unit 53 functions as a receiver for a serial transmission between the controller 10 and the image display unit 20. The right backlight control unit 201 drives the right backlight 221 based on the input control signal. The right backlight 221 is, for example, a light emitting device such as an LED or an electroluminescence (EL). The right LCD control unit 211 drives the right LCD 241 based on the clock signal PCLK input via the reception unit 53, the vertical synchronization signal VSync, the horizontal synchronization signal HSync, and the image data for the right eye. The right LCD 241 is a transmission type liquid crystal panel on which a plurality of pixels is arrayed in a matrix shape.

The right projection optical system 251 is configured to include a collimator lens that makes the image light emitted from the right LCD 241 become a light flux of parallel state. The right light guide plate 261 as the right optical image display unit 26 guides the image light emitted from the right projection optical system 251 to the right eye RE of the user while being reflected along a predetermined optical path. The right projection optical system 251 and the right light guide plate 261 are collectively referred to as a "light guide unit".

The left display drive unit 24 has a configuration similar to that of the right display drive unit 22. The left display drive unit 24 includes a reception unit 54 (Rx 54), the left backlight control unit 202 (left BL control unit 202) and the left backlight 222 (left BL 222) that function as light sources, the left LCD control unit 212 and the left LCD 242 that function as display elements, and a left projection optical system 252. The left backlight control unit 202 and the left backlight 222 function as light sources. The left LCD control unit 212 and the left LCD 242 function as display elements. The left backlight control unit 202, the left LCD control unit 212, the left backlight 222, and the left LCD 242 are collectively referred to as the "image light generation unit". In addition, the left projection optical system 252 is configured to include a collimator lens that makes the image light emitted from the left LCD 242 become a light flux of parallel state. The left light guide plate 262 as the left optical image display unit 28 guides the image light emitted from the left projection optical system 252 to the left eye LE of the user while being reflected along a predetermined optical path. The left projection optical system 252 and the left light guide plate 262 are collectively referred to as the "light guide unit".

Figure 3:
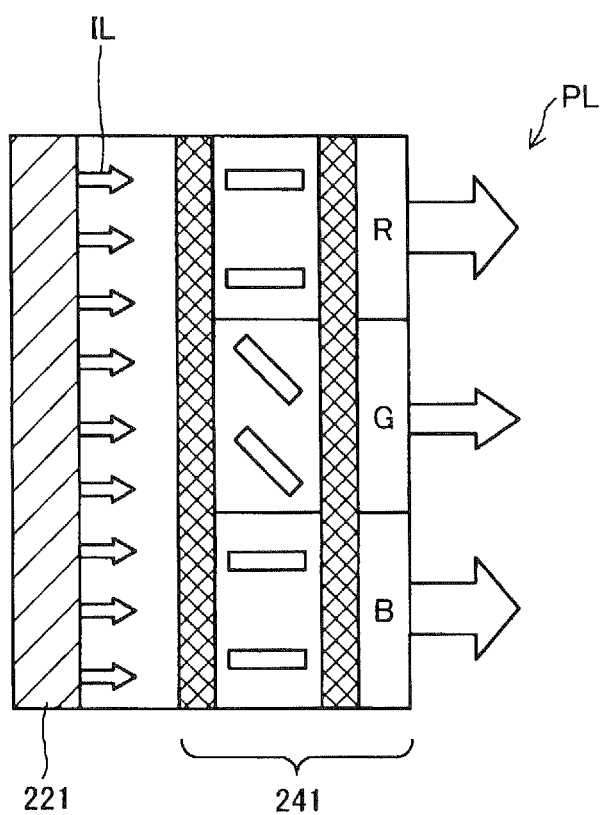
FIG. 3 is an explanatory diagram illustrating a state in which an image light is emitted by an image light generation unit.

FIG. 3 is an explanatory diagram illustrating a state in which an image light is emitted by an image light generation unit. The right LCD 241 changes the transmittance of the light transmitting the right LCD 241 by driving the liquid crystal at the pixel position arrayed in the matrix shape. As a result, an illumination light IL emitted from the right backlight 221 is modulated to an effective image light PL representing the image. The state in the left side is similar to that in the right side. As illustrated in FIG. 3, the backlight type is adopted in the present embodiment. However, the image light may be emitted using a configuration of a front light type or a reflection type.

A-2. Watermark Corresponding Image Display Processing

Figure 4:
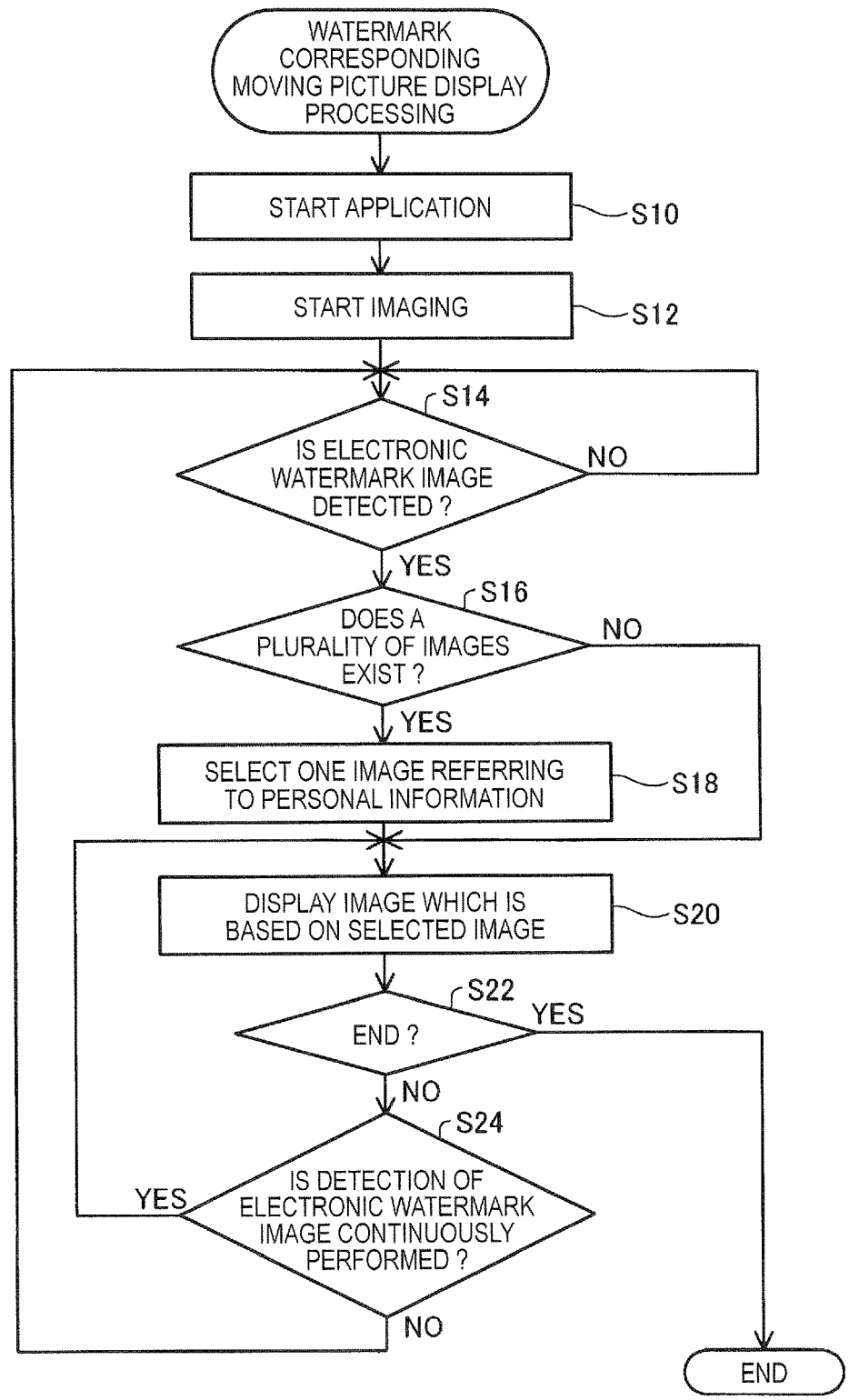
FIG. 4 is a flow chart illustrating a flow of watermark corresponding image display processing.

FIG. 4 is a flow chart illustrating a flow of the watermark corresponding image display processing. The watermark corresponding image display processing is processing in which the watermark corresponding image is displayed on the image display unit 20 by the controller 10 based on the electronic watermark image detected from the images captured by the camera 61.

Firstly, when the operation unit 135 receives a predetermined operation, the controller 10 starts an application for causing the HMD 100 to execute the electronic watermark corresponding image display processing (STEP S10). Next, the camera 61 that is associated with the started application starts to image the outside scene (STEP S12). The watermark information acquisition unit 168 detects the electronic watermark image from the images captured by the camera 61 (STEP S14). In a case where the electronic watermark image is not detected from the captured image (NO in STEP S14), the watermark information acquisition unit 168 continuously waits for the detection of the electronic watermark image from the captured image (STEP S14). In a case where the electronic watermark image is detected from the captured image (YES in STEP S14), the image setting unit 165 determines whether or not a plurality of images to be displayed on the image display unit 20, which are different from each other depending on the personal information such as the age, are included in the detected electronic watermark image (STEP S16). In a case where it is determined that a plurality of images which are different from each other are included in the detected electronic watermark image (YES in STEP S16), the image setting unit 165 selects one image from a plurality of different images embedded in the electronic watermark image by referring to the personal information of the user stored in the personal information DB 122 (STEP S18).

Figure 5:
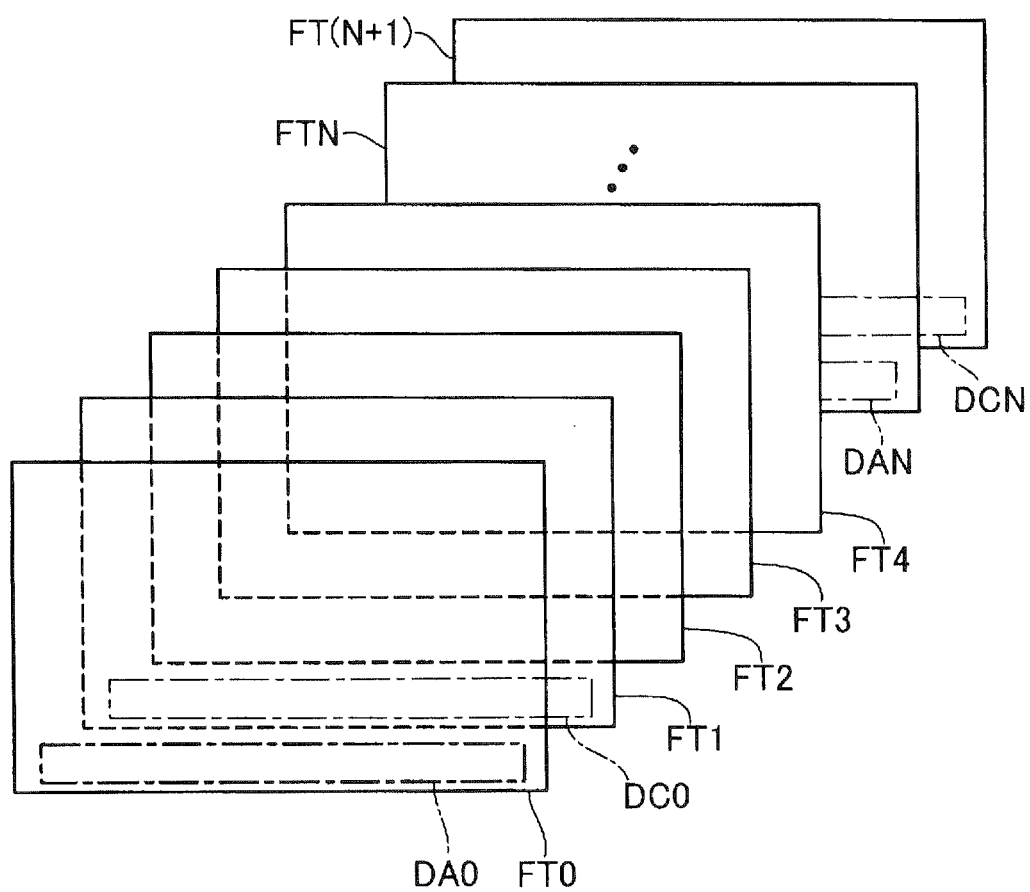
FIG. 5 is a schematic diagram illustrating an example of an electronic watermark image embedded in a plurality of frames forming a moving picture.

FIG. 5 is a schematic diagram illustrating an example of the electronic watermark image embedded in a plurality of frames forming a moving picture. In FIG. 5, each frame of a movie which is a moving picture visually recognized as the outside scene SC by the user and the images of the subtitle image embedded in the specific frame are illustrated. As described above, the moving picture is configured of 24 frames per second. As illustrated in FIG. 5, a subtitle image DA0 for adult is embedded in a frame FT0 at a certain time point T0, and a subtitle image DC0 for children is embedded in a frame FT1 at a certain time point T1 which is the next frame of the time point T0. In addition, in the frame FT2 at a certain time point T2 which is the next frame of the time point T1, the electronic watermark image is not embedded, and similarly, in the frame FT3 and FT4 also, the electronic watermark image is not embedded. Then, after m seconds from the frame FT0 (m=1, 2, 3 . . . ), that is, in the frame FTN (N is a multiple of 24) that is corresponding to the multiple of $24^{th}$ frame, a subtitle image DAN for adult is embedded, and in the frame FT (N+1) in which 1 is added to the multiple of $24^{th}$ frame, the subtitle image DCN for children is embedded. As described above, in the movie visually recognized by the user, the subtitle image for adult and the subtitle image for children are embedded in one frame among the 24 frames in one second. The subtitle image for children is embedded in the frame next to the frame in which the subtitle image for adult is embedded. The ratio of the Chinese characters in the image data of the subtitles for adult is higher than that in the image data of the subtitles for children, and the ratio of the Japanese characters is lower.

Figure 6:
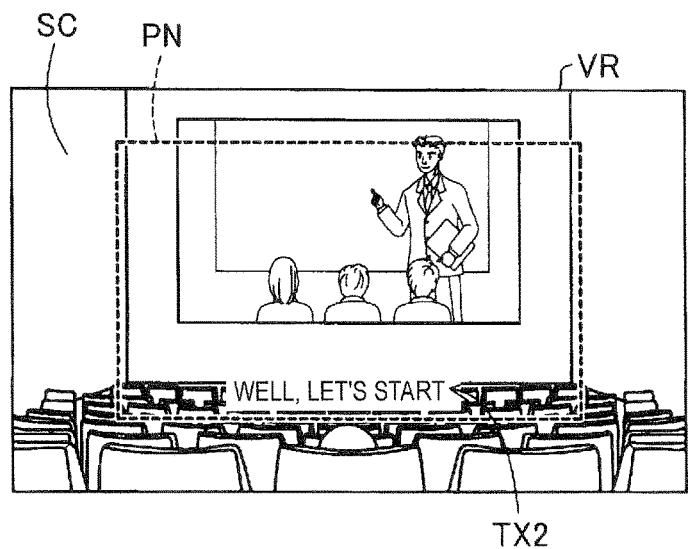
FIG. 6 is an explanatory diagram illustrating a field of view of a user in a case where a character image of subtitles of a movie which is based on the selected image is displayed.

When the processing in STEP S18 in FIG. 4 is performed, the image setting unit 165 displays the image which is based on one selected image (hereinafter, simply referred to as "selected image") on the image display unit 20 (STEP S20). FIG. 6 is an explanatory diagram illustrating a field of view VR of a user in a case where a character image TX2 of the subtitles of the movie which is based on the selected image is displayed. In FIG. 6, the field of view VR when the user watches a movie at a movie theater as an outside scene SC is illustrated. As illustrated in FIG. 6, the user visually recognizes the character image TX2 of the subtitles for adult displayed in an image display maximum area PN as the selected image in addition to the outside scene SC. The image display maximum area PN is a frame of maximum area in which the image display unit 20 can display the image, and is not visually recognized by the user. The character image TX2 is an image in which the voice output in a foreign language different from the Japanese language as the voice of the movie of the outside scene SC is expressed in the Japanese characters. The content of the character image TX2 is "Now, let's start". The character image TX2 corresponds to the "watermark information corresponding image" in the aspect of the invention.

In the processing in STEP S16 in FIG. 4, in a case where it is determined that a plurality of images which are different from each other are not included in the detected electronic watermark image (NO in STEP S16), the image setting unit 165 regards the one image embedded in the electronic watermark image as the selected image and displays the image which is based on the selected image on the image display unit 20 without referring to the personal information (STEP S20).

When the image which is based on the selected image is displayed on the image display unit 20 (STEP S20), the operation unit 135 monitors the reception of the predetermined operation for ending the application of the watermark corresponding image display processing (STEP S22). In a case where the predetermined operation is received (YES in STEP S22), the controller 10 ends the watermark corresponding image display processing. In a case where the predetermined operation is not received in the processing in STEP S22 (NO in STEP S22), the watermark information acquisition unit 168 monitors whether or not the detection of the detecting electronic watermark image is continuously performed (STEP S24). In a case where the detection of the detecting electronic watermark image is continuously performed (YES in STEP S24), the image setting unit 165 displays the image which is based on the detecting electronic watermark image on the image display unit 20 (STEP S20). In a case where the detected electronic watermark image is not detected in the processing in STEP S24 (NO in STEP S24), the watermark information acquisition unit 168 waits for new detection of the electronic watermark image (STEP S14).

As described above, in the HMD 100 in the present embodiment, the watermark information acquisition unit 168 detects the electronic watermark image from the images captured by the camera 61, and the image setting unit 165 displays the image which is based on the detected electronic watermark image on the image display unit 20. Therefore, in the HMD 100 in the present embodiment, even though the HMD 100 does not store the information associated with the electronic watermark image detected from the captured images, the image which is based on the electronic watermark image can be displayed on the image display unit 20, and thus, the usability of the HMD 100 is improved. In addition, in the HMD 100 unlike another device such as a television set, which a plurality of persons watch, only the user of the HMD 100 can visually recognize the image displayed on the image display unit 20, and thus, it is possible to cause only the user of the HMD 100 to visually recognize the image that is different from the image recognized by another person. Therefore, the usability of the HMD 100 is improved.

In addition, in the HMD 100 in the present embodiment, the age of the user is specified by collating the personal information that includes the age of the user stored in the personal information DB 122. In addition, in a case where a plurality of images that are different from each other depending on the age are included in the detected electronic watermark image, the image setting unit 165 selects one image from the plurality of images embedded in the electronic watermark image and different from each other by collating the ages of the users stored in the personal information DB 122, and displays the selected image on the image display unit 20. For this reason, in the HMD 100 in the present embodiment, even when the detected electronic watermark images are the same, the images that are different from each other according to the personal information such as the ages are displayed on the image display unit 20. Therefore, the images according to the needs or the state of the user can be visually recognized by the user, and thus, the user convenience is improved.

B. Second Embodiment

In the embodiments, comparing with the first embodiment, the configuration in the second embodiment is different in the point that the electronic watermark image detected by the watermark information acquisition unit 168 is not a moving picture but a still image, and other configurations are the same. Therefore, in the second embodiment, the electronic watermark image processing in a case where the still image is detected as the electronic watermark image by the watermark information acquisition unit 168 will be described, and the same processing as that in the case where the moving picture is detected as the electronic watermark image in the first embodiment will not be repeated.

In STEP S12 of the watermark corresponding image display processing (FIG. 4), in a case where the watermark information acquisition unit 168 detects a still image in which the electronic watermark image is embedded (YES in STEP S14), the watermark information acquisition unit 168 determines whether or not a plurality of electronic watermark images is embedded in the still image (STEP S16). When the still image in which the electronic watermark image is embedded is detected, the watermark information acquisition unit 168 ends the processing of detecting the electronic watermark with respect to the detected still image. In other words, regarding the still image in which the electronic watermark image is embedded, even though the still images continuously exist in the captured images, the watermark information acquisition unit 168 detects the electronic watermark image only one time, and does not detect thereafter. In the still image, different from the case of the moving picture, since the electronic watermark image embedded in the still image does not change, it is sufficient that the watermark information acquisition unit 168 detects the still image in which the electronic watermark image is embedded only one time. In the second embodiment, in a case where the image in which the electronic watermark image is embedded is the still image, since the watermark information acquisition unit 168 detects the still image only one time, the processing burden to the controller 10 can be reduced. The watermark information acquisition unit 168 detects the image (including the moving picture) in which a not detected new electronic watermark image is embedded, from the captured images.

C. Modification Example

The invention is not limited to the embodiment described above and various aspects can be embodied without departing from the spirit thereof. For example, the following modification can also be possible.

C-1. Modification Example 1

In the watermark corresponding image display processing in the embodiment described above, the subtitles of the movie are exemplified as the image displayed on the image display unit 20 based on the image embedded in the electronic watermark image. However, there may be various modifications in the electronic watermark image processing. For example, the watermark information acquisition unit 168 may output electronic data of a discount coupon that can be used in a specific store based on the electronic watermark image. In a case where the electronic data is data of a shaver for the man, the coupon which is based on the electronic data according to the gender of the user of the HMD 100 stored in the personal information DB 122 may be displayed on the image display unit 20. In this case, in a case where it is determined that the gender of the user stored in the personal information DB 122 is male, the watermark information acquisition unit 168 outputs the coupon which is based on the electronic data. In addition, in a case where the HMD 100 does not include the personal information DB 122 or in a case where the information regarding the gender is not stored in the personal information DB 122 included in the HMD 100, the coupon which is based on the electronic data may be output to all the HMD 100 in which the watermark information acquisition unit 168 detects the electronic watermark image regardless of the information stored in the personal information DB 122. In this modification example, since the watermark information acquisition unit 168 outputs the electronic data embedded in the detected electronic watermark image, it is possible to output to the user not only the image which is based on the image data embedded in the electronic watermark image but also the electronic data. Therefore, the user convenience is improved.

In addition, if the image embedded in the electronic watermark image is an image that changes with the change of the time, the image may be displayed on the image display unit 20 based on the image detected according to a predetermined timing. For example, in a case where the electronic watermark image is an image that indicates various kinds of fortunes, the watermark information acquisition unit 168 detects the watermark image at the timing when the determination key 11 is pressed in STEP S18 in FIG. 4 as the predetermined timing. Thereafter, the image setting unit 165 displays the image which is based on the detected image data on the image display unit 20. The image or the data that changes with the change of the time is not limited to the image indicating the fortune, but may be the electronic data of the discount coupon of which the discount rate randomly changes with the change of the time.

C-2. Modification Example 2

In the watermark corresponding image display processing in the first embodiment described above, in a case where the electronic watermark image in which the watermark image is embedded is detected, the image setting unit 165 displays the image which is based on the detected electronic watermark image on the image display unit 20. However, the image setting unit 165 does not necessarily need to display the image which is based on the detected electronic watermark image on the image display unit 20. For example, in a case where the electronic watermark image is detected, the watermark information acquisition unit 168 notifies the user of the fact that the electronic watermark image is detected, and then, the image setting unit 165 may set whether or not to display the image or the displaying mode by the operation of the user. As the method of notifying the user of the fact that the electronic watermark image is detected, for example, a character image saying "the electronic watermark is detected" may be displayed on the image display unit 20, or a voice saying "the electronic watermark is detected" may be output via the earphones 32 and 34.

Figure 7:
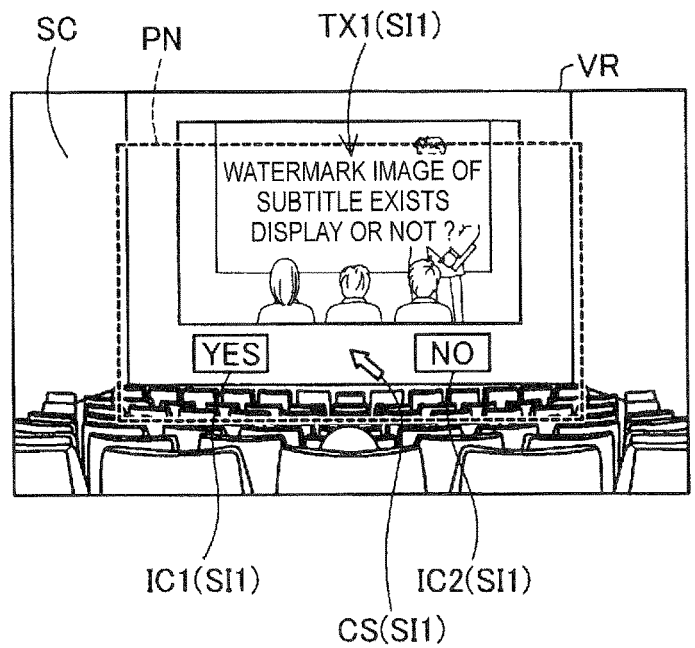
FIG. 7 is an explanatory diagram illustrating a field of view of a user in a case where the user selects whether or not to display the image.

After notifying the user of the fact that the electronic watermark image is detected, the watermark information acquisition unit 168 may cause the user to select whether or not to display the image which is based on the electronic watermark image on the image display unit 20. FIG. 7 is an explanatory diagram illustrating a field of view VR of the user in a case where the user selects whether or not to display the image. In the movie as the outside scene SC visually recognized by the user, the electronic watermark is applied as the subtitle image. As illustrated in FIG. 7, a selection image SI1 for causing the user to select whether or not to display the subtitle image includes a character image TX1, an icon image IC1, an icon image IC2, and a cursor image CS. The character image TX1 is an image that asks the user whether or not to display the subtitles when subtitles exist which are embedded in the electronic watermark image in the movie that is visually recognized by the user. The character image TX1 is an image displayed in the image display maximum area PN as characters saying "A watermark image of the subtitles exists. Display it or not?" The display position of the cursor image CS in the image display maximum area PN is changed by the user's operation of the operation unit 135. When the determination key 11 of the operation unit 135 is pressed in the state in which the cursor image CS overlaps the icon image IC1 or the icon image IC2, the icon image with which the cursor image CS overlaps is selected.

C-3. Modification Example 3

In the first embodiment described above, the subtitle image is displayed on the image display unit 20 after collating the personal information of the user stored in the personal information DB 122. However, the image setting unit 165 may display the image which is based on the image embedded in the electronic watermark image on the image display unit 20 regardless of the personal information of the user stored in the personal information DB 122. In addition, the HMD 100 includes the personal information DB 122 that stores the personal information of the user. However, the personal information DB 122 does not necessarily need to be included. For example, it may be determined whether or not the personal information of the user stored in the personal information DB 122 is collated by the operation unit 135 receiving a predetermined operation. In addition, the image setting unit 165 may display the image indicating that a plurality of images different from each other are included in the electronic watermark image on the image display unit 20, and may cause the user to select one image among the plurality of images by the operation unit 135 receiving the predetermined operation. In addition, since only one image is embedded in the electronic watermark image, the image setting unit 165 may determine whether or not to display the image which is based on the electronic watermark image by collating the personal information of the user stored in the personal information DB 122. In addition, in this case, instead of not displaying the image embedded in the electronic watermark image on the image display unit 20, the image setting unit 165 may display the image indicating that the user is not a subject to be displayed of the image embedded in the electronic watermark image on the image display unit 20. For example, in a case where some electronic watermark images in which a description of the copyright is embedded is stored in the storage unit 120 in advance as the watermark information, and a copy image of the electronic watermark image which is different from the original is detected, the image setting unit 165 may display a character image indicating the copyright violation on the image display unit 20. In addition, in a case where the watermark information acquisition unit 168 detects a plurality of electronic watermark images from the captured images, the image setting unit 165 may cause the user to select the electronic watermark image in which the image the user wants to visually recognize is embedded, by the user's operation of the operation unit 135.

In the embodiment described above, the number of frames of the moving picture per second is 24 frames. However, the number of frames of the moving picture per unit time is not limited to 24 frames, but can be variously modified. In addition, in the watermark corresponding image display processing in the first embodiment described above, in the moving picture, the frame in which the electronic watermark image is embedded is one frame among the 24 frames per second. However, the number of frames in the electronic watermark image is embedded can be variously modified. For example, the electronic watermark image may be embedded in only one frame in a few seconds, or the electronic watermark image may be embedded in a plurality of frames in one second.

In the embodiment described above, the HMD 100 is a transmission type head mounted display device, but may be a non-transmission type head mounted display device. In the HMD 100, it is sufficient that as long as a medium in which the electronic watermark is applied is imaged, and the image which is based on the image embedded in the detected electronic watermark image can be displayed.

In the embodiment described above, the subtitles of the movie are displayed on the image display unit 20 based on the image embedded in the electronic watermark image. However, not being limited thereto, various modifications can be made in the processing performed based on the electronic watermark applied to the electronic watermark image. For example, the image setting unit 165 may perform processing on the electronic watermark image which is visually recognized by the user via the image display unit 20 by controlling the image light forming unit or the dimming plate based on the electronic watermark. In a case where the user visually recognizes the movie to which the electronic watermark is applied, the image setting unit 165 may change the contrast of the electronic watermark image which is visually recognized by the user by adjusting the light transmittance of the dimming plate according to the electronic watermark applied as a performance property of the movie. In addition, with respect to an image of a specific object included in the movie, the image setting unit 165 may change the image which is visually recognized by the user in a case where there is no image display unit 20 by superimposing the generated images.

C-4. Modification Example 4

In the embodiment described above, the operation unit 135 is formed in the controller 10. However, the aspect of the operation unit 135 can be variously modified. For example, it may be an aspect having an user interface which is the operation unit 135 separate from the controller 10. In this case, since the operation unit 135 is separate from the controller 10 on which the power source 130 or the like is formed, it is possible to miniaturize the size, thereby improving the operability of the user. In addition, the camera 61 is disposed on the image display unit 20. However, the camera 61 may be configured separately from the image display unit 20 so as to be able to capture the outside scene SC.

For example, the image light generation unit may be configured to include an organic electro-luminescence (organic EL) display and an organic EL control unit. In addition, for example, instead of LCD, the image light generation unit can use liquid crystal on silicon (LCOS®) or a digital micro-mirror device. In addition, for example, it is also possible to apply the invention to a laser retina projection type HMD 100.

In addition, for example, the HMD 100 may be a head mounted display having an aspect in which an optical image display unit covers only a part of the eyes of the user, in other words, an aspect in which the optical image display unit does not completely cover the eyes of the user. In addition, the HMD 100 may be a so-called monocular type head mounted display. In addition, the HMD 100 is a binocular and an optical transmission type. However, the invention can similarly be applied to a head mounted display device of another type such as a video transmission type.

In addition, an ear-hook type earphone or a headband type earphone may be adopted, or the earphone may be omitted. In addition, for example, the head mounted display device may be configured so as to be mounted on a vehicle such as an automobile or an airplane. In addition, for example, the head mounted display device may be configured so as to be built in a body protector such as a helmet.

C-5. Modification Example 5

The configuration of the HMD 100 in the present embodiment is only an example and various modifications can be made. For example, the direction key 16 provided on the controller 10 may be omitted or another operational interface such as an operational stick may be provided in addition to the direction key 16 and the track pad 14. In addition, the controller 10 has a configuration such that input devices such as a keyboard or a mouse can be connected. The HMD 100 may receive the input from the keyboard or the mouse.

In addition, as the image display unit, instead of the image display unit 20 mounted like eyeglasses, for example, another type of image display unit such as the image display unit that is mounted like a cap may be adopted. In addition, the earphones 32 and 34 can appropriately be omitted. In addition, in the embodiment described above, the LCD and the light source are used as the configuration for generating the image light. However, instead of this, another display element such as an organic EL display may be adopted.

Figure 8A:
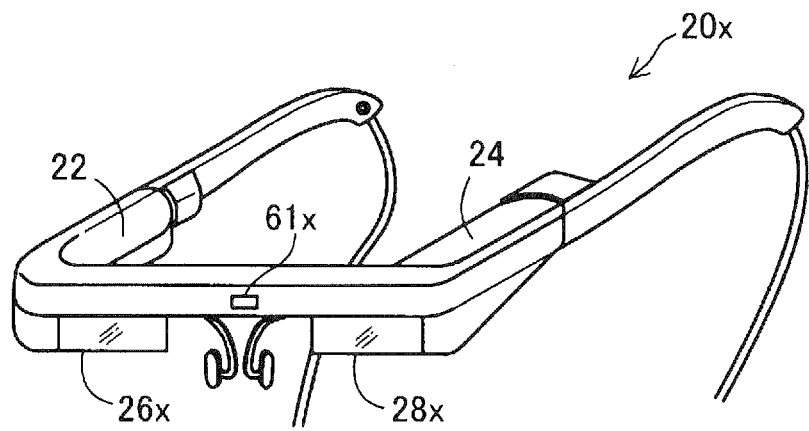
FIGS. 8A and 8B are explanatory diagrams illustrating appearance configurations of a head mounted display device in a modification example.
Figure 8B:
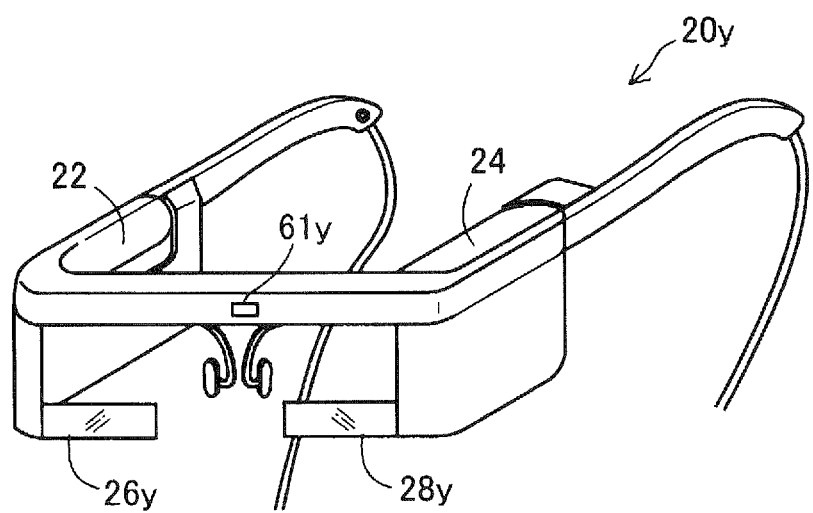

FIGS. 8A and 8B are explanatory diagrams illustrating appearance configurations of a head mounted display device in a modification example. In a case of an example in FIG. 8A, the configuration of the HMD in the modification example is different from the HMD 100 illustrated in FIG. 1 in a point that: the image display unit 20x includes a right optical image display unit 26x instead of the right optical image display unit 26, and includes a left optical image display unit 28x instead of the left optical image display unit 28. The right optical image display unit 26x is formed smaller than the optical member in the embodiment described above, and is disposed diagonally upward from on the right eye of the user when mounting the HMD 100x. Similarly, the left optical image display unit 28x is formed smaller than the optical member in the embodiment described above, and is disposed diagonally upward from on the left eye of the user when mounting the HMD 100x. In a case of an example in FIG. 8B, the configuration of the HMD in the modification example is different from the HMD 100 illustrated in FIG. 1 in a point that: the image display unit 20y includes a right optical image display unit 26y instead of the right optical image display unit 26, and includes a left optical image display unit 28y instead of the left optical image display unit 28. The right optical image display unit 26y is formed smaller than the optical member in the embodiment described above, and is disposed diagonally upward from the right eye of the user when mounting the head mounted display. The left optical image display unit 28y is formed smaller than the optical member in the embodiment described above, and is disposed diagonally downward from the left eye of the user when mounting the head mounted display. In this way, it is sufficient if the optical image display units are disposed in the vicinity of the eyes of the user. In addition, the size of the optical member that forms the optical image display unit is also optional, and thus, it is possible to implement the aspect of the HMD 100 such that the optical image display unit covers only a part of the eyes of the user, in other words, such that the unit does not completely covers the eyes of the user.

In addition, in the embodiment described above, the HMD 100 may guide an image light representing the same images to the right and left eyes of the user such that the user visually recognizes two-dimensional images, or may guide an image light representing the different images to the right and left eyes of the user such that the user visually recognizes three-dimensional images.

In addition, in the embodiment described above, a part of the configuration that is implemented by hardware may replaced by software, or conversely, a part of the configuration that is implemented by software may be replaced by hardware. For example, in the embodiment described above, the functions of the image processing unit 160 and the voice processing unit 170 are implemented by the CPU 140 reading and executing the computer program. However, these function units may be implemented by a hardware circuit.

In addition, in a case where a part or all of the functions of the invention are implemented by software, the software (computer program) can be provided in the form of being stored in the computer-readable storage medium. In the invention, "computer-readable storage medium" is not limited to a portable type storage medium such as a flexible disk or CD-ROM but includes an external storage device fixed to the computer such as a hard disk or the like and an internal storage device in the computer such as various RAM, ROM or the like.

In addition, in the embodiment described above, as illustrated in FIG. 2 and FIG. 3, the controller 10 and the image display unit 20 are configured to be separate from each other. However, the configuration of the controller 10 and the image display unit 20 is not limited thereto and various modifications can be made. For example, all of the configurations formed in the controller 10 may be formed in the image display unit 20 or a part thereof is formed in the image display unit 20. In addition, the power source 130 in the embodiment described above may have a configuration of being independently formed and being replaceable, or the power source 130 may be formed in a duplicated manner in the image display unit 20 in addition to the configuration of being formed in the controller 10. For example, the CPU 140 illustrated in FIG. 2 may be formed on both of the controller 10 and the image display unit 20, or the functions performed by the CPU 140 formed in the controller 10 and the CPU formed in the image display unit 20 may be separately divided.

The invention is not limited to the embodiment and the modification examples described above and can be implemented by various configurations without departing from the spirit of the invention. For example, the technical features in the embodiment and the modification examples corresponding to the technical features in each aspect described in the SUMMARY can appropriately be replaced or combined in order to solve a part or all of the problems described above, or in order to achieve a part or all of the effects described above. In addition, if the technical features are not described as essential herein, the technical features may appropriately be deleted.

The entire disclosure of Japanese Patent Application No. 2014-187590, filed Sep. 16, 2014 is expressly incorporated by reference herein.

What is claimed is:

1. A head mounted display device comprising:
an imaging unit comprising a camera that images an outside scene;
an image display that displays an image and is capable of transmitting the outside scene;
an electronic watermark acquisition unit that, when executed by a processor, acquires an electronic watermark image embedded such that watermark information is not visually recognized by a user from a captured image of the outside scene, wherein the electronic watermark image includes a first image and a second image such that the first image and the second image are embedded in every N frame from each other's different specific frame, wherein N is an integer greater than 0, and wherein the second image is a different image from the first image;
an image setting unit comprising a CPU that determines whether the first image and the second image should be selected by referring to personal information of the user stored in a personal information database, and selects the first image or the second image based on the determination by image setting unit; and
a display image controller that displays a watermark information corresponding image associated with the watermark information embedded in the selected electronic watermark image on the image display.

2. The head mounted display device according to claim 1, wherein the electronic watermark acquisition unit outputs the watermark information embedded in the selected first or second image.

3. The head mounted display device according to claim 1, further comprising:
a personal information specification unit that, when executed by a processor, specifies personal information,
wherein the display image controller sets the watermark information corresponding image based on the specified personal information.

4. The head mounted display device according to claim 3, wherein, in a case where the watermark information embedded in the selected first or second image includes plural kinds of watermark information corresponding images, the display image controller selects one image among the plural kinds of the watermark information corresponding images based on the specified personal information, and displays the selected one watermark information corresponding image on the image display.

5. The head mounted display device according to claim 4, further comprising:
an operation unit comprising an interface that receives an operation,
wherein the electronic watermark acquisition unit acquires one watermark information item from the plural kinds of the watermark information based on the received operation timing.

6. The head mounted display device according to claim 3, wherein the personal information is information associated with an age of the user of the head mounted display device.

7. The head mounted display device according to claim 1, wherein, in a case where the watermark image is a moving picture configured of a plurality of frames, the electronic watermark acquisition unit selects and acquires the frame in which the watermark information is embedded among the plurality of frames.

8. The head mounted display device according to claim 1, wherein the display image controller adds information associated with the watermark image based on the watermark information embedded in the acquired watermark image.

9. The head mounted display device according to claim 1, wherein
the first image and the second image are embedded in every N frame from each other's different specific frame with frames in between the frames having the first image and the second image not having embedded watermark images.

10. A control method for a head mounted display including an imaging unit comprising a camera that images an outside scene and an image display that displays an image and is capable of transmitting the outside scene, the method comprising:
acquiring an electronic watermark image embedded such that watermark information is not visually recognized by a user from a captured image of the outside scene, wherein the electronic watermark image includes a first image and a second image such that the first image and the second image are embedded in every N frame from each other's different specific frame, wherein N is an integer greater than 0, and wherein the second image is a different image from the first image;
determining whether one image from the first image and the second image should be selected by referring to personal information of the user stored in a personal information database, and selecting the first image or the second image based on the determination; and
displaying a watermark information corresponding image associated with the watermark information embedded in a selected image on the image display.

11. A non-transitory computer readable medium embodying a computer program for a head mounted display device that includes an imaging unit comprising a camera that images an outside scene and an image display that displays an image and is capable of transmitting the outside scene, the computer program, when executed by a computer, causes the computer to implement:
an electronic watermark detection function for acquiring an electronic watermark image embedded such that watermark information is not visually recognized by a user from a captured image of the outside scene, wherein the electronic watermark image includes a first image and a second image such that the first image and the second image are embedded in every N frame from each other's different specific frame, wherein N is an integer greater than 0, and wherein the second image is a different image from the first image;

an image setting unit comprising a CPU that determines whether the first image and the second image should be selected by referring to personal information of the user stored in a personal information database, and selects the first image or the second image based on the determination by image setting unit; and a display image control function for displaying watermark information corresponding image associated with the watermark information embedded in the selected first or second image on the image display.

* * * * *